W. S. McNEIL.
Car Heater.

No. 91,148. Patented June 8, 1869.

United States Patent Office.

WILLIAM S. McNEIL, OF SPRINGFIELD, MASSACHUSETTS, ASSIGNOR TO AMERICAN CAR-HEATING COMPANY, OF NEW YORK CITY.

Letters Patent No. 91,148, dated June 8, 1869.

CAR-HEATER AND VENTILATOR.

The Schedule referred to in these Letters Patent and making part of the same.

*To whom it may concern:*

Be it known that I, WILLIAM S. McNEIL, of Springfield, Hampden county, Massachusetts, have invented certain new and useful Improvements in Apparatus for Heating and Ventilating Railroad-Cars; and I hereby declare the following to be a full, clear, and exact description of the same, reference being had to the accompanying drawings, in which—

My invention relates to the apparatus for which Letters Patent of the United States were issued to McNeil and Cadwell, on the 25th August, 1868, and is designed to improve the construction and arrangement of said apparatus. To this end, It consists—

First, in certain improvements in the devices whereby the air taken in from the exterior of and above the the car is purified, or purified and heated; and, Secondly, in an improved arrangement of the heating-portion of the structure, so as to economize room, and at the same time impart to the air the required heat.

The nature of these improvements can best be explained and understood by reference to the accompanying drawings.

The pipe A, through which air is taken from above the moving car, is united at its base with, and opens into a larger cylinder, B, which contains the means for purifying the air.

The lower part of the cylinder is filled with water, a suitable pipe, *a*, being provided for admitting the water, and another pipe being provided for the overflow, and a pipe, or conduit, C, which is also contained in the cylinder, and receives air from the pipe A, opens into the inner heating-chamber D, around the fire-box E, of the apparatus.

Around the upper end of the conduit C is a slanting partition, *b*, which divides the box, or cylinder B, into two parts, and leading out from the lowest point of the slanting partition is a discharge-tube, *c*.

That portion of the air-conduit C which extends above the partition is surmounted by a conical gauze cap, or screen, *d*, and the lower part of the conduit is perforated, or cut away, as shown at *e f*, so that the air may be brought in contact with the water or vapor rising therefrom. By these means, it will be seen that the purifying can be thoroughly effected.

Figure 1:
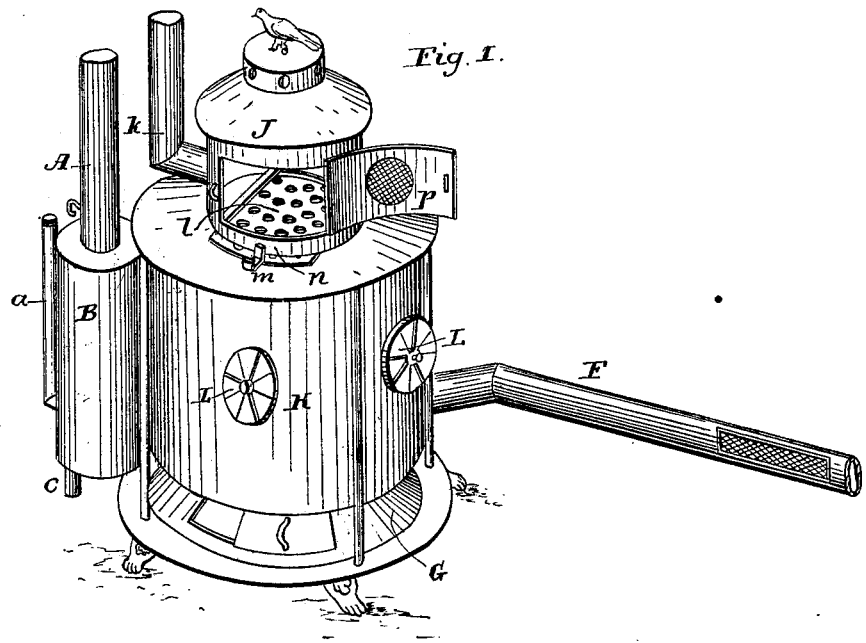
Figure 1 is a perspective view of a heating-apparatus constructed in accordance with my invention.
Figure 2:
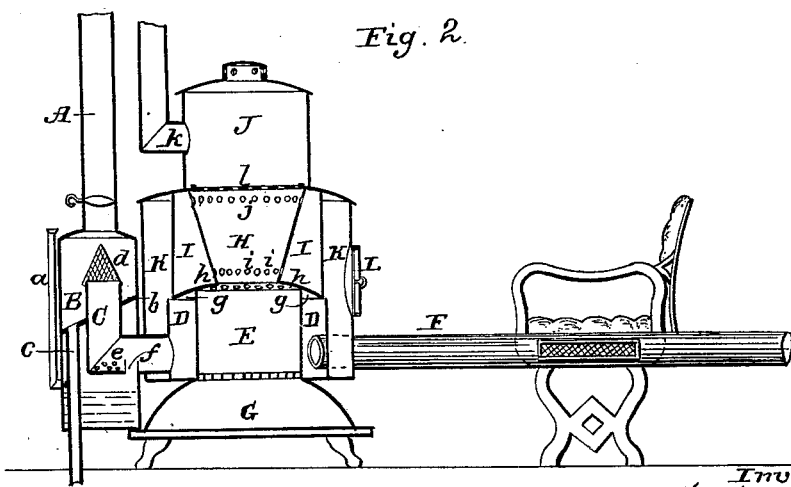
Figure 2 is a vertical central section of the same.

The cinders, passing with the air through the pipe A, are deflected from the conical or tapering screen *d*, (which also serves, in a measure, to deflect the smoke which enters along with the cinders,) and, falling upon the slanting partition *b*, are carried down to the tube *c*, through which they are discharged from the apparatus. The air, thus freed from all extraneous matter to a greater or less extent, passes into the conduit C, and into the water-chamber, where it is still further purified, and thence it passes to the heating-chamber D, from which it is discharged through the register-pipe F, arranged along the side of the car, as shown in fig. 2.

Little dirt, if any, can enter the water-chamber, which is thus kept clean, while the cinders and other extraneous matter, as soon as caught by the screen, are discharged from the apparatus, as above described.

The fire-box, or stove proper, E, rests upon a base, or ash-box, G, provided with a sliding door, or equivalent means, for obtaining access to the same, and effecting the regulation of the draught.

The fire-box, as above stated, is surrounded by the heating-chamber D, which extends up to about the height of the box, and is there closed and united with the box, by means of a cap, *g*. This cap is cut away to receive the lower end of the magazine, or hopper H, through which fuel is fed to the fire, and the magazine is surrounded by a cylinder which rests upon the cap *g*, forming a second chamber, I, which receives the flames and products of combustion from the fire-box, through apertures *h* in the cap, as well as apertures *i* in the magazine.

The upper end of the magazine, or feed-hopper, is also perforated, at *j*, to permit the escape of the smoke, which passes up into the dome J, and out through the smoke-pipe K.

The top of the magazine, to prevent accident from fire, is closed by a sliding screen-plate, *l*, which can be withdrawn whenever required. It is provided with a finger-piece, or handle, *m*, projecting from the stove, and with a second piece, *n*, which, when the screen-plate covers the magazine, rests against the dome, just under the opening, which is closed by the door *p*.

When the latter is shut and secured by a lock and key in the usual manner, its lower part will overlap and press tightly against the holding-piece *n*, and thus lock the screen-plate securely in place, so that in case of an accident, even if the stove be overturned, the fuel cannot escape from the fire-box, so long as the door remains closed.

Surrounding the air-chamber D and heating-space I is an exterior drum, forming the annular chamber K, which overhangs the base G. This chamber, in contradistinction to the chamber D, which receives and heats the air taken in from above the moving car, is intended to furnish a supply of heated air when the car is at rest. To this end, it is provided at its bottom with a series of apertures, to admit air, which is heated by the heat radiated from the space I, and is then discharged into the car through registers L.

I am aware that the apparatus shown in the patent hereinbefore referred to embodies the general features above described, that is so say, the purifying-apparatus, the chamber around the fire-box, for heating the supply of air received while the car is in motion, the chamber for receiving, heating, and discharging air while the car is at rest, and the space above the fire-box, for heating the latter supply of air.

So far as concerns the purifying-apparatus, the nature of the present improvement will, however, be readily perceived, and as regards the heating-portion of the apparatus, it will be noted, that by raising the heating-chambers above the base, and by the employment of the dome, (which, it should be said, is provided with registers, as shown in the drawing, for regulating the draught,) access can be had with much greater ease to the fire-box, greater security against danger of fire, in case of accident, is attained, and the air-heating chambers, as well as those which contain the fuel and flame and products of combustion, can be arranged much more compactly and in a smaller space than was practicable before.

The flames and other products of combustion, after passing through the upper heating-space I, return through the magazine or feed-tube, and thence pass through the screen-plate *l*, up into the dome, and out through the chimney, or smoke-pipe.

Having now described my invention, and the manner in which the same is or may be carried into effect,

What I claim, and desire to secure by Letters Patent, is—

1. The employment, with the conduit for conducting air from the exterior of the car to the heating-apparatus, of a slanting, or inclined partition within such conduit, for receiving and deflecting the cinders and other impurities entering with the air, and a discharge-orifice, located at or near the lowest point of the partition, for the escape of the cinders and other matter thus collected, substantially as herein set forth.

2. The combination, with the air-induction pipe and slanting partition, as above described, of a second pipe, or conduit, leading to the heating-apparatus, and extending up through the said partition, so as to receive air from the air-induction pipe, and provided with a conical, or tapering screen, for deflecting upon the partition the impurities which enter with the air, substantially as and for the purposes described.

3. The combination, with the elements named in the preceding clause, of the water-cylinder, or chamber, within which the inclined partition and the pipe passing through the same are arranged, as hereinbefore shown and specified.

4. The air-purifying apparatus, constructed as herein specified, in combination with the heating-apparatus, substantially as shown and set forth.

5. The arrangement, in an apparatus such as described, of the fire-box, the feed-hopper, or magazine, the upper heating-space, the two receiving and heating-chambers, and the dome surmounting said parts, substantially in the manner shown and specified.

6. The employment, in connection with the dome and the hopper, or feed-tube opening into the fire-box, as described, of a sliding screen-plate, covering the hopper, and adapted to be locked, or held in place by the door carried by the dome, as and for the purposes shown and set forth.

In testimony whereof, I have signed my name to this specification, before two subscribing witnesses.

WM. S. McNEIL.

Witnesses:
STEPHEN E. SEYMOUR.
W. M. GRAY.